Aug. 7, 1923.
1,464,159
J. F. TROTH
AUTOMATIC COW HOLDING STANCHION
Filed Jan. 15, 1923
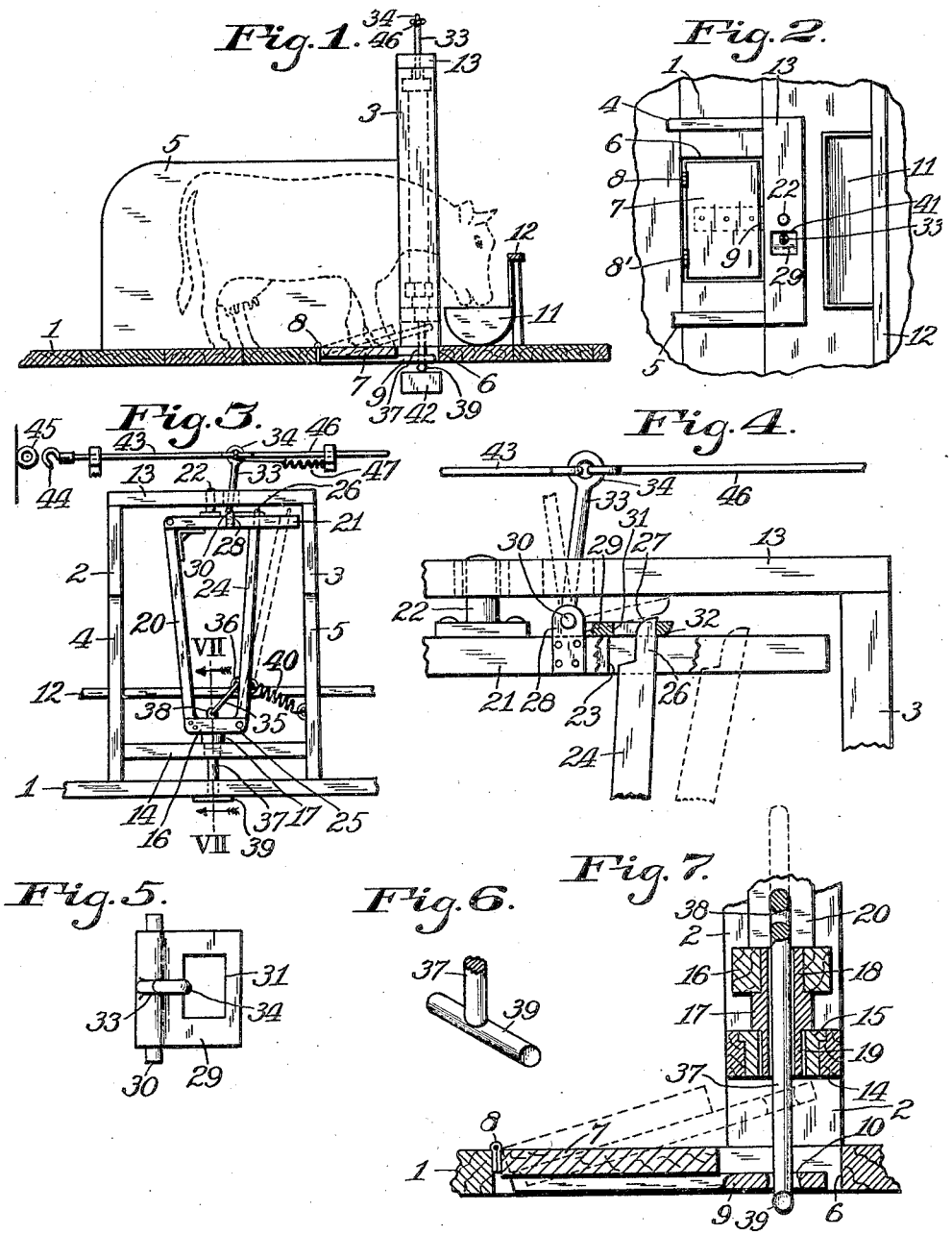
INVENTOR:
James F. Troth,
BY E. D. Silvius,
ATTORNEY.

Patented Aug. 7, 1923.

1,464,159

UNITED STATES PATENT OFFICE.

JAMES F. TROTH, OF WASHINGTON TOWNSHIP, OWEN COUNTY, INDIANA.

AUTOMATIC COW-HOLDING STANCHION.

Application filed January 15, 1923. Serial No. 612,596.

*To all whom it may concern:*

Be it known that I, JAMES F. TROTH, a citizen of the United States, residing in Washington Township, in the county of Owen and State of Indiana, have invented new and useful Automatic Cow-Holding Stanchions, of which the following is a specification, reference being had to the accompanying drawings, and to the letters and figures of reference marked thereon.

This invention relates to stanchions for holding animals to prevent them from leaving their stalls or freely walking about, the invention having reference more particularly to cow-holding stanchions for use in dairies, particularly when milking or feeding the cows.

An object of the invention is to provide improved cow-holding stanchions of such construction as to be adapted to be controlled by the animals when they enter their stalls to eat, so as to operate to hold the animals in the stalls with limited movement therein.

Another object is to provide improved stanchions that shall be so constructed as to be adapted to be used in series in connection with a series of stalls where animals may eat, which stanchions shall have latches connected together in series and adapted to be separately controlled by the animals, an aim being to insure that each animal be held after entering its stall and eating therein.

A further object is to provide cow-holding stanchions which shall be so constructed as to be operated by a cow entering a stall and eating there, which shall hold the cow in the stall while being milked but permitting the cow to have some freedom of movement so as to not be in cramped position while eating.

A still further object is to provide improved cow-holding stanchions which may be constructed and installed at a reasonable cost and which shall be reliable, durable and economical in use.

With the above-mentioned and other objects in view, the invention consists in treadle-operated cow-holding stanchions of novel structure provided with improved controlling means and improved arrangement thereof; and further consisting in the parts and combinations and arrangements of parts as hereinafter particularly described and further defined in the claims appended hereto.

Referring to the drawings,—Figure 1 is a sectional side elevation of the improved cow-holding stanchions in connection with a stall, a cow being indicated by broken lines as eating while being held by the stanchions; Fig. 2 is a fragmentary top plan of Fig. 1; Fig. 3 is an end elevation of the stall having the improved stanchions therein; Fig. 4 is a fragmentary reproduction of Fig. 3, on an enlarged scale; Fig. 5 is a top plan of a latch preferably embraced in the invention; Fig. 6 is a fragmentary perspective view of one of the elements of the control apparatus preferably employed; and, Fig. 7 is a fragmentary section approximately on the line VII—VII in Fig. 3.

Similar reference characters in the various figures of the drawings indicate corresponding elements or features of construction herein referred to in detail.

In practically carrying out the objects of the invention a suitable floor 1 is provided or may already exist, and two posts 2 and 3 are erected upon the floor and have side walls or partitions 4 and 5 connected thereto to constitute a stall, a plurality of stalls usually being arranged side by side. The floor preferably has an opening 6 therein between the posts and extending a suitable distance beyond one side of the posts, a separate floor section 7 being arranged in the opening and having one edge connected to the floor by means of hinges 8 so as to constitute a treadle which preferably has an arm 9 fixed thereto and extending in the space between the posts, the arm having an aperture 10 therein. Beyond the opposite side of the posts a suitable feed-trough or box 11 is arranged, usually against a gangway rail or wall 12. A cap beam 13 is secured upon the tops of the posts, and a base beam 14 is arranged between the posts and preferably secured thereto at a suitable distance above the floor. The base beam has a central aperture therein preferably having a bearing box 15 in it. A base bar 16 is arranged above the beam 14 as preferably constructed and is provided with a hollow centerpiece 17 that is supported upon the box 15 and is secured to the base bar 16 preferably by means of a shank 18 secured in the bar, the centerpiece having a hollow boss 19 on its lower end that is rotatably guided in the box 15. A main stanchion 20 is rigidly fixed at its lower end to the base bar 16 and extends upward toward the cap beam 13, preferably leaning towards the post 2. The stanchion has a top bar 21 fixed to the upper portion thereof that extends towards the opposite post 3, and it is provided with a center-pin 22 that is secured upon its top in alinement with the centerpiece 17 and is rotatively guided by the cap beam 13. The top bar 21 has a guide-way 23 therein at a suitable distance from the main stanchion. A companion stanchion 24 is connected by means of a pivot 25 to the base bar 16 and extends upward divergently from the main stanchion, the companion stanchion having its upper portion movably guided in the guide-way, so that its pivotal movements shall be stopped against the ends of the guide-way; and said upper portion has a latch portion 26 provided with a beveled or curved upper end 27 facing towards the center-pin 22. A pivot stand 28 is secured to the top bar 21 between the center-pin and the guide-way and supports a suitable latch or catch which preferably comprises a plate 29 having a pivot 30 supported by the pivot stand, the plate having an aperture 31 to receive the latch portion 26, the plate having a beveled or rounded end 32 facing downwardly to be engaged by the end 27 whereby to force the plate upward to permit the latch portion 26 to move into the aperture 31. The plate 29 has an operating arm 33 fixed thereto that extends upward so as to be accessible and have a control in harmony with other latch devices, the arm preferably having an eye 34 on its upper end.

The companion stanchion is operated by suitable devices, preferably by a pull-rod 35 connected to the stanchion by means of an eye 36 and a link 37 formed as a rod and extending through the centerpiece 17 and the aperture 10 in the treadle, the upper portion of the link having an eye 38 to which the pull rod 35 is connected, the lower end of the link having a cross-bar 39 fixed thereto that extends under the treadle lever 9. Thus a downward movement of the treadle causes the stanchion 24 to be swung over into engagement with the latch. For drawing the stanchion 24 away from the latch when released a spring 40 is connected to the stanchion and to the adjacent post 3, the spring tending to hold the stanchions against rotary movement but permitting slight rotary movement. Preferably the arm 33 extends through an aperture 41 in the cap beam 13, the aperture being of sufficient width to clear the arm when the stanchions are slightly moved rotatively. The treadle may be limited in its downward movement by a suitable stop-block 42 supported below it or under the cross-bar 39.

A latch-pull 43, which preferably is in the form of a cord or rope is connected to the latch arm 33 whereby to move it so as to lift the catch plate 29, and it is provided with a hook 44 to be connected to a suitable anchored eye or device 45 whereby the catch plate 29 may be held up to free the companion stanchion. A similar latch-pull 46 is connected to the arm 33 whereby to retract the latches of other stanchions.

The catch plate 29 may be adapted to fall by the force of gravity so as to be operative but preferably is impelled to act by means of a suitable spring, which may be a coil spring 47 suitably anchored and connected with the eye 34, thus tending to directly overcome friction and retract the latch-pulls.

In practical use feed is to be placed in the feed troughs, the latch-pulls are to be operated to release all the companion stanchions in the series if not already released, after which the cows may be admitted to the stalls, each cow intuitively entering a stall and seeking the food designed for it, the head of the cow first passing through the space between the stanchions, following which the front feet of the cow must come upon the treadle 7 and force it downward, resulting in the companion stanchion being swung over to the latch and engaged thereby with the neck of the cow between the stanchions, the space being too narrow to permit the head of the cow to be withdrawn. While the cow eats it may move its head sidewise and cause the stanchion to slightly turn, the stanchion likewise turning in case the cow shifts its body sidewise. While the cow is held and engaged in eating, milking operations may be conducted. When it is desired to release the cows the latch-pulls are operated and fastened so that all the catch plates 29 are lifted and release the companion stanchions which swing away from the main stanchions and release the cows as they back away from the treadle. The stanchions may be used for holding animals for various purposes when necessary or desirable, as will be understood.

What I claim is:—

1. Automatic cow-holding stanchions including a pair of stanchions pivotally connected one to another at their lower ends, a latch to connect the stanchions together at their upper portions, one of the stanchions having means to swing it away from the other when relased from the latch, and a cow-operated treadle and connections to swing the released stanchion back into engagement with the latch.

2. Automatic cow-holding stanchions including a main stanchion provided with a latch; a companion stanchion having pivotal connection with the main stanchion to swing into connection with the latch, a spring connected to the companion stanchion to draw it away from the latch, and a treadle having connection with the companion stanchion to force it to the latch.

3. Automatic cow-holding stanchions including a pair of stanchions pivotally connected one to another at their lower ends, a spring-actuated latch to connect the stanchions together at their upper portions, pivotal devices supporting and guiding the pair of stanchions for slight rotative movement on a vertical axis, a spring operating on one of the stanchions to swing it away from the other when released from the latch, and a cow-operated treadle having connections to swing the released stanchion back into engagement with the latch.

4. Automatic cow-holding stanchions including a frame, a pair of stanchions pivotally connected one with the other at their lower ends, an automatic latch to connect the upper portions of the stanchions together, pivotal devices supporting and guiding the pair of stanchions in the frame for slight rotative movement on a vertical axis, a spring connected to the frame and operating on one of the stanchions to swing it away from the other when released from the latch and operating also to yieldingly restrain rotative movement of the pair of stanchions, and a treadle and connections to swing the released stanchions back to the latch.

5. Automatic cow-holding stanchions including a base bar, a main stanchion rigidly fixed to the base bar, a top bar fixed to the top of the main stanchion and having a guideway, a companion stanchion pivoted to the base bar and extending through the guideway, a latch mounted on the top bar adjacent to the guideway to engage the companion stanchion, the latch having an operating-spring, a spring connected to the companion stanchion to draw it away from the latch, a link connected to the companion stanchion to draw it to the latch, and a floor section hinged at one end thereof and having its opposite end connected to the link.

6. Automatic cow-holding stanchions comprising a floor, two posts upon the floor, a base beam secured to the posts, a cap beam secured upon the posts, a base bar rotatively supported upon the base beam, a main stanchion affixed to the base bar, a top bar fixed to the main stanchion and rotatively guided by the cap beam, the top bar having a guideway, an automatically-actuated latch mounted on the top bar adjacent to the guideway, a companion stanchion pivoted to the base bar to swing into engagement with the latch, means connected with the latch to retract it, a spring connected with the companion stanchion and the adjacent one of the posts to swing the stanchion away from the latch, a link connected to the companion stanchion, and a treadle hinged at one end to the floor and having its opposite end connected with the link.

In testimony whereof, I affix my signature on the 4 day of January 1923.

JAMES F. TROTH.